(12) United States Patent
Fehlig

(10) Patent No.: US 6,564,495 B1
(45) Date of Patent: May 20, 2003

(54) METHOD AND APPARATUS FOR IDENTIFYING FISHING LINE SPECIFICATIONS

(76) Inventor: Kenneth L. Fehlig, 14705 Greenleaf Valley Dr., Chesterfield, MO (US) 63017

( * ) Notice: Subject to any disclaimer, the term of this patent is extended or adjusted under 35 U.S.C. 154(b) by 13 days.

(21) Appl. No.: 09/713,437

(22) Filed: Nov. 15, 2000

(51) Int. Cl.$^7$ .............................................. A01K 69/00
(52) U.S. Cl. ........................................................ 43/4.5
(58) Field of Search .............................. 156/85, 86, 84; 40/316; 43/44.98; 264/230, 342 R; 116/306, 309–314, 322

(56) References Cited

U.S. PATENT DOCUMENTS

| | | | | |
|---|---|---|---|---|
| 3,070,063 A | * | 12/1962 | Lennon | 116/309 |
| 4,202,544 A | * | 5/1980 | Popma | 273/DIG. 26 |
| 4,557,215 A | * | 12/1985 | Petersson | 116/222 |
| 4,724,548 A | * | 2/1988 | London | 2/170 |
| 5,924,639 A | * | 7/1999 | Atherton | 116/309 |
| 6,081,925 A | * | 7/2000 | Reiber | 2/125 |

FOREIGN PATENT DOCUMENTS

DE 26 55 958 A1 * 6/1978 ............ H01B/7/36

OTHER PUBLICATIONS

Derwent, 1999, Slotted plastic markers for electrical cables and leads—slide from magazine chassis onto leads and have mating projections and grooves, Derwent Information Ltd.*

* cited by examiner

*Primary Examiner*—Charles T. Jordan
*Assistant Examiner*—Bret Hayes
(74) *Attorney, Agent, or Firm*—Thompson Coburn LLP

(57) ABSTRACT

A method and apparatus for identifying fishing line specification comprises providing a fishing rod and reel assembly. The fishing rod and reel assembly comprises a fishing rod and a fishing reel. The method includes placing a fishing line having a particular specification on the fishing rod and reel assembly and attaching to one of said fishing rod and fishing reel a label having indicia thereon representative of the particular specification of the fishing line. The label is attached in a manner to enable a user of the fishing rod and reel assembly to view the indicia while the user is fishing with the fishing rod and reel assembly.

15 Claims, 1 Drawing Sheet

METHOD AND APPARATUS FOR IDENTIFYING FISHING LINE SPECIFICATIONS

BACKGROUND OF THE INVENTION

This invention relates to identifying a particular specification of fishing line installed on a fishing rod and reel assembly and, more particularly, to identifying a particular specification of fishing line by using a label having indicia thereon that is representative of the particular specification.

A typical angler (fisherman/fisherwoman) has a plurality of fishing rod and reel assemblies to accommodate the various types of fish desired to be caught and the various conditions that can exist at the time of fishing. Each fishing rod and reel assembly is usually adapted for a specific purpose and has specifications suitable for that purpose. One way a fishing rod and reel assembly is adapted for a specific purpose is through the choice of fishing line installed on the fishing rod and reel assembly. Often, an angler has a plurality of different types of fishing lines that fit on a fishing reel to choose from or purchase. The angler chooses the type of line that best fits his/her fishing needs. The type of line chosen may be based on line test (tensile strength) or some other line specification. Because various factors—such as the material of construction, the diameter of the fishing line, and the number of filaments used in making the fishing line—determine the particular specifications of the fishing line, an angler cannot ascertain by looking at the fishing line the particular specifications for that fishing line. Therefore, an angler needs to either remember the particular specifications of the fishing line installed on each of the fishing rod and reel assemblies or maintain a record of the particular specifications of the fishing line installed on each of the fishing rod and reel assemblies.

SUMMARY OF THE INVENTION

As the number of fishing rod and reel assemblies employed by an angler increases, it becomes increasingly difficult for the angler to remember or keep track of the particular specifications of the fishing line installed on each of the various fishing rod and reel assemblies. Additionally, any written record of the particular specifications of each of the fishing lines installed on the various fishing rod and reel assemblies may not be available at the time the angler is selecting a fishing rod and reel assembly to use. Furthermore, because anglers remove the existing fishing line and install a different fishing line on a fishing rod and reel assembly, any marking on the fishing rod and reel assembly to indicate the particular specifications of the fishing line should preferably be capable of being removed or changed. Therefore, to alleviate the need for the angler to remember or record the particular specifications of the fishing line installed on a fishing rod and reel assembly, a method of visually identifying the particular specifications of the fishing line installed on a fishing rod and, reel assembly is needed. Additionally, such method preferably should also be nonpermanent and capable of being removed from the fishing rod and reel assembly without damaging the fishing rod and reel assembly.

Among the several objects of the present invention is the provision of a method and apparatus that overcomes the above mentioned disadvantages; the provision of such method and apparatus which is of simple construction; and the provision of such method and apparatus which is easy to use.

In general, a method of the present invention comprises providing a fishing rod and reel assembly comprised of a fishing rod and a fishing reel. The method includes placing a fishing line having a particular specification on the fishing rod and reel assembly and attaching to one of the fishing rod and fishing reel a label having indicia thereon that is representative of the particular specification of the fishing line. The label is attached in a manner to enable a user of the fishing rod and reel assembly to view the indicia while the user is fishing with the fishing rod and reel assembly.

In another aspect of the present invention, the method comprises providing a fishing rod and reel assembly comprised of a fishing rod and a fishing reel. The method includes providing a package that contains a fishing line having a particular specification and a label having indicia thereon that is representative of the particular specification, removing the fishing line from the package, and placing the fishing line on the fishing rod and reel assembly. The label is then attached to one of the fishing rod and fishing reel in a manner to enable a user of the fishing rod and reel assembly to view the indicia while the user is fishing with the fishing rod and reel assembly.

In general, the apparatus of the present invention is a kit for use with a fishing rod and reel assembly. The fishing rod and reel assembly comprises a fishing rod and fishing reel and the kit comprises a fishing line and a label. The fishing line has a particular specification and the label has indicia thereon that is representative of the particular fishing line specification. The label has first and second ends and a length therebetween. The label is moveable between a coiled position and an uncoiled position with the label being biased toward the coiled position so that the label assumes the coiled position when no external forces are acting on the label. The label is moveable to the uncoiled position by the application of an external pulling force on the label. The label is adapted to wrap around a portion of the fishing rod in a manner to enable a user of the fishing rod and reel assembly to view the indicia while the user is fishing with the fishing rod and reel assembly.

Other objects and features will be in part apparent and in part pointed out hereinafter.

DETAILED DESCRIPTION OF THE PREFERRED EMBODIMENT

Figure 1:
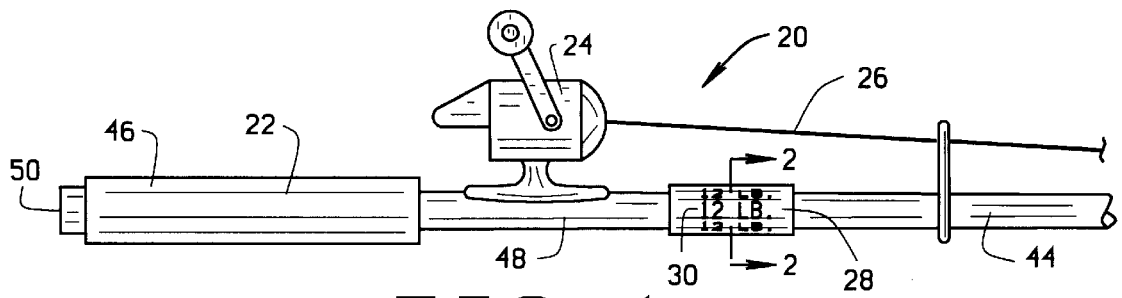
FIG. 1 is a side elevation view of a fishing rod and reel assembly and a label of the present invention attached to the fishing rod.

Referring now to the drawings, and first more particularly to FIG. 1, a fishing rod and reel assembly is generally indicated at 20. The fishing rod and reel assembly 20 is comprised of a fishing rod 22 and a fishing reel 24. Fishing line 26 having a particular specification (e.g. line test) is installed on the fishing rod and reel assembly 20. A label, generally indicated at 28, is attached to the fishing rod 22. The label 28 has indicia 30 representative of the particular specification of the fishing line 26. The indicia 30 on the label 28 is preferably in plain view so that a user of the fishing rod and reel assembly 20 can view the indicia 30 when fishing with the fishing rod and reel assembly or when selecting a particular rod and reel assembly to use. Although the label 28 is preferably (as shown) attached to the fishing rod 22, it is to be understood that the label may be attached to the fishing reel 24 without departing from the scope of the invention.

The label 28 is shown as having indicia 30 representative of the line test or tensile strength of the fishing line 26. However, it is to be understood that the fishing line 26 has several specifications and any of the specifications may be displayed on the label 28 by the indicia 30. For example, the indicia 30 may be representative of the manufacturer of the fishing line 26, the type of material from which the fishing line is made, the thickness of the fishing line 26, and/or any other particular specification of the fishing line 26. It should also be understood that while the label 28 is shown as having indicia 30 representative of a single specification of the fishing line 26, the label may have indicia representative of more than a single specification of the fishing line without departing from the scope of the invention as defined by the claims.

Figure 5:
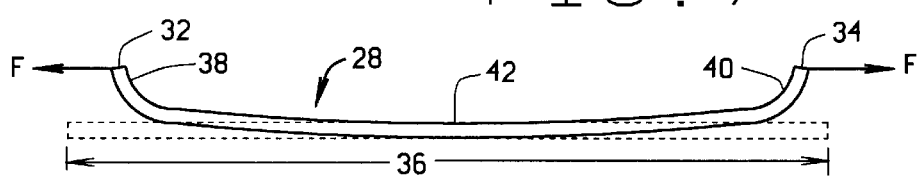
FIG. 5 is a side-elevational view of the label of FIG. 3 in an uncoiled position due to the application of external pulling forces.
Figure 6:
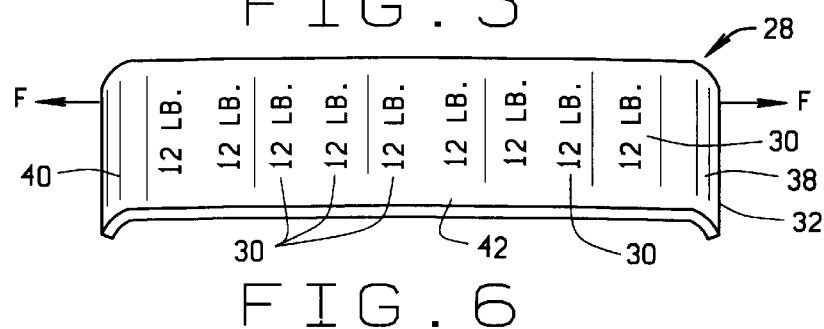
FIG. 6 is a perspective view of the bottom of the uncoiled label of FIG. 5.

Referring now to FIGS. 5 and 6, the label 28 has first and second ends 32, 34 and a length 36 therebetween. Adjacent the first end 32 is a first end margin 38 and adjacent the second end 34 is a second end margin 40. An intermediate portion 42 extends between the first and second end margins 38, 40.

Preferably, the label 28 is a self-coiling label, i.e. a label that is biased to curl or roll up in a coiling manner without the application of any external forces. The self-coiling label 28 may be made from any material capable of being biased to curl or roll up in a coiling manner without the application of any external forces. Applicant has found that a polyester film works well for making self-coiling labels and applicant's label 28 is preferably made from a polyester film. A suitable type of self-coiling label is commercially available from Vulcan Spring & Mfg. Co. of Telford, Pa., under the trade designation Vulcan Self-Coiling Scrolls. The indicia 30 may be applied to the label 28 via a conventional printing process or by any other manner known in the industry. The label 28 can also have a protective coating placed over the indicia 30 to protect the indicia from ultraviolet rays, alcohol, bug spray or any other hazards to which the label may be exposed. Applicant has found that a protective coat of varnish is useful in protecting the indicia 30.

Typical fishing rod and reel assemblies 20 are balanced to provide the angler with a certain "feel" when fishing. The balancing of the fishing rod and reel assembly 20 can be accomplished by adding weights (not shown) to the fishing rod and reel assembly. Preferably, the label 28 is light weight so that the label does not alter the balance of the fishing rod and reel assembly 20 and does not alter the "feel" of the fishing rod and reel assembly. It is also preferable that the label 28 not inhibit fishing with the fishing rod and reel assembly 20.

Figure 3:
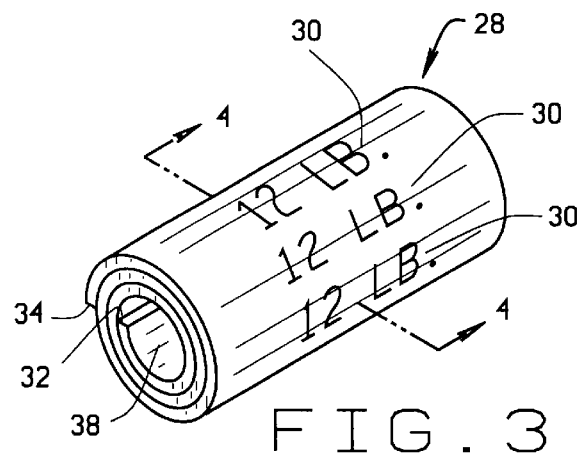
FIG. 3 is a perspective view of the label of FIG. 1 in a relaxed state and not attached to the fishing rod.
Figure 4:
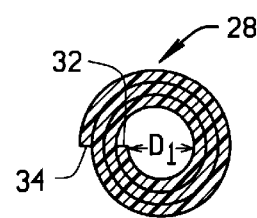
FIG. 4 is a cross-sectional view taken along the plane of line 4—4 of FIG. 3.

FIGS. 3 and 4 show the self-coiling label 28 in a relaxed state, that is with no external forces acting on the label. When in the relaxed state, the label 28 is biased to self-coil to an inner diameter $D_1$, as shown in FIG. 4. The label 28 is moveable to an uncoiled position (FIGS. 5 and 6) by the application of an external force F. It is to be understood that movement of the label 28 from its relaxed position to its uncoiled position may be accomplished by a user pulling on the label with his/her hands. While the label 28 is shown in its relaxed state as forming three complete coils, it should be understood that the number of coils formed by the label when in its relaxed state is determined by the length 36 of the label and the diameter $D_1$ to which the label is biased to self-coil. The label 28 can be of any length and biased to self-coil to any diameter that is suitable for its intended purpose without departing from the scope of the invention.

Figure 2:
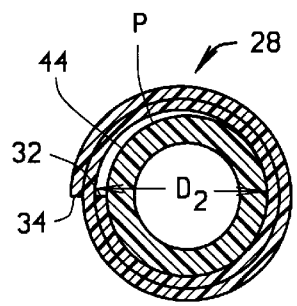
FIG. 2 is a cross-sectional view taken along the plane of line 2—2 of FIG. 1.

The fishing rod 22 is a typical fishing rod. The fishing rod 22 has a shaft 44, a handle 46 surrounding a portion of the shaft, and a reel-receiving seat 48. The shaft 44 extends from a handle end 50 to a tip (not shown). The fishing reel 24 attaches to the fishing rod 22 at the seat 48. The shaft 44, as shown in FIG. 2, has an outer diameter $D_2$. As stated above, the label 28 is preferably attached to the fishing rod 22. More preferably, the label 28 is attached to the shaft 44 of the fishing rod 22 between the seat 48 and the tip.

Preferably, the diameter $D_1$ is smaller than the outer diameter $D_2$ of the portion of the fishing rod shaft 44 to which the label 28 is to be attached. Because the label inner diameter $D_1$ is smaller than the shaft diameter $D_2$, the label first end 32 and the label first end margin 38 exert a generally radially inward spring force on the shaft 44. The generally radially inward spring force causes the label 28 to be snuggly attached to the shaft 44 and helps minimize or even eliminates movement of the label along the shaft 44.

Preferably, the length 36 of the label 28 is larger than a perimeter P of the fishing rod shaft 44 so that at least a portion of the label first end margin 38 is overlapped by the label. Even more preferably, the length 36 of the label 28 is sufficient to enable the label to wrap around the shaft 44 two or more times. When the length 36 is larger than the shaft perimeter P, the label 28 may wrap all the way around the shaft 44 and overlap onto itself, as shown in FIG. 2. The overlapping of the label 28 causes the label to exert a generally radially inward force upon itself and helps to prevent the label from detaching from the shaft 44.

Preferably, the indicia 30, as shown in FIG. 6, repeats along the length 36 of the label 28. The repetition of the indicia 30 allows the indicia to be visible to a user of the fishing rod and reel assembly 20 regardless of the length 36 of the label 28 or the amount of overlapping of the label onto itself.

Figure 7:
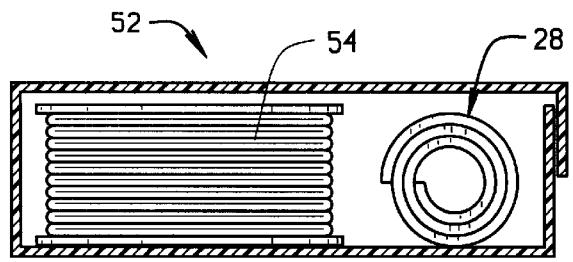
FIG. 7 is a schematic of a kit of the present invention.

In a preferred embodiment, a kit, generally indicated as 52 in FIG. 7, comprises the label 28 of FIG. 3 and a spool of fishing line 54. The kit 52 is for use with a fishing rod and reel assembly 20. The spool of fishing line 54 contains fishing line 26 having a particular specification. The label 28 has indicia 30 that is representative of the particular specification of the fishing line 26. As shown in FIG. 1, the label 28 is adapted to wrap around a portion of the fishing rod shaft 44 in a manner to enable a user of the fishing rod and reel assembly 20 to view the indicia 30 when fishing with the fishing rod and reel assembly.

In use, the kit 52 is opened and the spool of fishing line 54 is removed from the kit. At least a portion of the fishing line 26 on the spool 54 is then placed on the fishing rod and reel assembly 20. The label 28 is removed from the kit 52 and is attached to the fishing rod 22 in a manner to enable a user of the fishing rod and reel assembly 20 to view the indicia 30 when fishing with the fishing rod and reel assembly. The label 28 is preferably maintained attached to the fishing rod 22 while the user is fishing with the fishing rod and reel assembly 20.

The label 28 is attached to the fishing rod 22 by first uncoiling the label by applying an external force F to the label. Next, either the first end 32 or second end 34 of the uncoiled label 28 is placed on the fishing rod 22 at a location on the fishing rod where it is desired to display the indicia 30. Then, the label 28 is allowed to self-coil around the fishing rod 22 by wrapping the label around the fishing rod. The label 28 is now attached to the fishing rod and reel assembly 20.

The label 28 can be repeatedly attached to and removed from any fishing rod and reel assembly 20 without damaging either the label or the fishing rod and reel assembly. The label 28 does not require the use of any adhesives or mechanical means to attach the label to the fishing rod and reel assembly 20. The label 28 also does not rely upon static cling to cause the label to adhere either to itself or to the fishing rod and reel assembly 20. Because the label 28 is attached to the fishing rod and reel assembly 20 by the self-coiling action of the label, the label need not be permanently attached, adhered, or bonded to the fishing rod and reel assembly and can be removed from the fishing rod and reel assembly without damaging either the label or the fishing rod and reel assembly. Therefore, the label 28 can be removed from the fishing rod and reel assembly 20 and attached to a different fishing rod and reel assembly (not shown but as discussed above, the fishing rod and reel assembly 20 is a typical fishing rod and reel assembly and all references to a fishing rod and reel assembly should be understood to mean a typical fishing rod and reel assembly) without damaging the fishing rod and reel assembly or the label.

To remove the label 28 from the fishing rod and reel assembly 20, an external force F is applied to either the first or second end 32, 34 (which ever is exposed) of the label. The label 28 is then uncoiled by unwinding the label from the fishing rod and reel assembly 20. When the label 28 has been sufficiently unwound and uncoiled, the label can be removed from the fishing rod and reel assembly 20. The label 28 may then be used on the same or a different fishing rod and reel assembly 20 by attaching the label in the manner discussed above.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed:

1. A method comprising:
   providing a fishing rod and reel assembly comprising a fishing rod and a fishing reel;
   providing a package containing a fishing line and a label, the fishing line having a particular specification, the label having indicia thereon representative of the particular specification;
   removing the fishing line from the package;
   placing the fishing line on the fishing rod and reel assembly; and
   attaching the label to one of the fishing rod and fishing reel in a manner to enable a user of the fishing rod and reel assembly to view the indicia while the user is fishing with the fishing rod and reel assembly.

2. The method of claim 1 further comprising the step of maintaining the label attached to said one of the fishing rod and fishing reel while the user is fishing with the fishing rod and reel assembly.

3. The method of claim 1 wherein the step of attaching the label comprises attaching the label to the fishing rod.

4. The method of claim 1 wherein the label is a self-coiling label, wherein the step of providing a label further comprises providing a self-coiling label, and wherein the step of attaching the label further comprises the steps of:
   uncoiling the label;
   placing the uncoiled label on the fishing rod at a location on the fishing rod where it is desired to display the indicia; and
   allowing the label to self-coil around the fishing rod by wrapping the label around the fishing rod.

5. The method of claim 4 wherein the step of providing a self-coiling label further comprises providing a self-coiling label with a bias to self-coil to an inner diameter that is smaller.than an outer diameter of the fishing rod at the location on the fishing rod where it is desired to display the indicia so that the self-coiling of the label holds the label to the fishing rod in a snug manner.

6. The method of claim 4 wherein the step of providing a self-coiling label further comprises providing a self-coiling label with a length that is greater than a perimeter of the fishing rod at the location on the fishing rod where it is desired to display the indicia so that the label can be wrapped completely around the fishing rod and so that at least a portion of the label overlaps onto itself when wrapped around the fishing rod.

7. The method of claim 6 wherein the step of providing a label having indicia thereon further comprises providing a label having indicia that repeats along the length of the label so that at least a portion of the indicia is always visible when the label is wrapped around the fishing rod.

8. The method of claim 1 wherein the particular specification of the fishing line is line test, and wherein the step of attaching the label comprises attaching the label having indicia thereon representative of the line test of the fishing line.

9. The method of claim 1 wherein said one of the fishing rod and fishing reel comprise one of a first fishing rod and a first fishing reel and further comprising the steps of:
   removing the label from said one of the first fishing rod and first fishing reel; and
   attaching the label to one of a second fishing rod and second fishing reel, the steps of removing the label from said one of the first fishing rod and first fishing reel and attaching the label to said one of the second fishing rod and second fishing reel is accomplished without damaging the label or said one of the first fishing rod and first fishing reel or said one of the second fishing rod and second fishing reel.

10. The method of claim 9 wherein the label is a self-coiling label, and wherein the step of providing a label further comprises providing a self-coiling label.

11. The method of claim 10 wherein the label is a self-coiling polyester film label, and wherein the step of providing a self-coiling label comprises providing a self-coiling polyester film label.

12. The method of claim 1 wherein the step of attaching the label does not involve using adhesives or bonding the label to said one of the fishing rod and fishing reel so that the label may be removed from said one of the fishing rod and fishing reel without damaging the label or said one of the fishing rod and fishing reel.

13. A kit for use with a fishing rod and reel assembly, the assembly having a fishing rod and a fishing reel, the kit comprising:

a fishing line having a particular specification; and a label having indicia thereon representative of the particular specification of the fishing line, the label having first and second ends and a length therebetween, the label being moveable between a coiled position and an uncoiled position, the label being biased toward the coiled position so that the label assumes the coiled position when no external forces are acting on the label, the label being moveable to the uncoiled position by application of external pulling forces on the label, the label being adapted to wrap around a portion of the fishing rod in a manner to enable a user of the fishing rod and reel assembly to view the indicia while the user is fishing with the fishing rod and reel assembly.

14. The kit of claim 13 wherein the particular specification is line test, and wherein the indicia is representative of the line test.

15. The kit of claim 13 wherein the indicia repeats along the length of the label.

* * * * *